US012561124B2

(12) United States Patent
Bisa et al.

(10) Patent No.: US 12,561,124 B2
(45) Date of Patent: Feb. 24, 2026

(54) SYSTEMS AND METHODS FOR FIRMWARE UPDATES USING HARDWARE ACCELERATORS

(71) Applicant: Dell Products, L.P., Round Rock, TX (US)

(72) Inventors: Rama Rao Bisa, Bangalore (IN); Mini Thottunkal Thankappan, Bangalore (IN); Dharma Bhushan Ramaiah, Bangalore (IN); Shinose Abdul Rahiman, Bangalore (IN); Vineeth Radhakrishnan, Palakkad (IN); Javad Mohammed Basheer, Kozhikode (IN); Kapil Kalra, Bengaluru (IN)

(73) Assignee: Dell Products, L.P., Round Rock, TX (US)

( * ) Notice: Subject to any disclaimer, the term of this patent is extended or adjusted under 35 U.S.C. 154(b) by 734 days.

(21) Appl. No.: 17/934,778

(22) Filed: Sep. 23, 2022

(65) Prior Publication Data

US 2024/0103827 A1 Mar. 28, 2024

(51) Int. Cl.
G06F 8/65 (2018.01)
G06F 9/50 (2006.01)

(52) U.S. Cl.
CPC .............. G06F 8/65 (2013.01); G06F 9/5044 (2013.01)

(58) Field of Classification Search
None
See application file for complete search history.

(56) References Cited

U.S. PATENT DOCUMENTS

| 9,092,296 B1 * | 7/2015 | Nay | G06F 8/654 |
| 10,606,784 B1 * | 3/2020 | Jreij | G06F 13/4282 |
| 11,520,891 B1 * | 12/2022 | Karolitsky | H04L 9/3247 |
| 2005/0228888 A1 * | 10/2005 | Mihm | G06F 8/65 |
| | | | 709/227 |
| 2007/0150715 A1 * | 6/2007 | Rothman | G06F 8/65 |
| | | | 713/1 |
| 2008/0208897 A1 * | 8/2008 | Lew | G06F 16/2255 |

(Continued)

FOREIGN PATENT DOCUMENTS

| CN | 109542490 A | * | 3/2019 | G06F 16/27 |
| DE | 102018122830 A1 | * | 3/2019 | G06F 8/654 |
| JP | 2002540649 A | * | 11/2002 | H04Q 9/00 |

*Primary Examiner* — Philip Wang
(74) *Attorney, Agent, or Firm* — Fogarty LLP

(57) ABSTRACT

System and methods are provided for updating firmware used by a managed hardware component of an Information Handling System (IHS). A remote access controller of the IHS, that operates separate from CPUs of the IHS and that provides remote management of the IHS, initiates an update of firmware used to operate the hardware component. A programmable hardware accelerator is detected within an inventory of managed hardware components of the IHS. Availability of the hardware accelerator is determined for transmission of data to the hardware component. Transmission of a firmware image to the hardware component is delegated to the hardware accelerator, providing faster transmission of the firmware image than would be possible by the remote access controller. Upon transmission of the firmware image by the hardware accelerator, the firmware of the hardware component is updated using the firmware image transmitted by the hardware accelerator.

15 Claims, 5 Drawing Sheets

(56)　　　　　　References Cited

U.S. PATENT DOCUMENTS

| | | | | |
|---|---|---|---|---|
| 2011/0083129 A1* | 4/2011 | Masaki | G06F 8/65 | 717/175 |
| 2013/0125107 A1* | 5/2013 | Bandakka | H04L 67/10 | 717/171 |
| 2015/0263956 A1* | 9/2015 | Errickson | H04L 69/14 | 370/235 |
| 2017/0085383 A1* | 3/2017 | Rao | G06F 21/575 | |
| 2018/0270079 A1* | 9/2018 | Chamarajnager | H04L 41/046 | |
| 2019/0087172 A1* | 3/2019 | Lappi | G06F 16/27 | |
| 2020/0082088 A1* | 3/2020 | Muthukumaran | G06F 21/64 | |
| 2020/0183867 A1* | 6/2020 | Ender | G06F 13/404 | |
| 2020/0364041 A1* | 11/2020 | Bulusu | G06F 8/65 | |
| 2022/0050673 A1* | 2/2022 | Nakazawa | G06F 8/71 | |
| 2022/0137948 A1* | 5/2022 | Chang | G06F 11/3055 | 717/173 |
| 2023/0185581 A1* | 6/2023 | Huang | G06F 12/0638 | 718/102 |
| 2023/0297680 A1* | 9/2023 | Bose | G06F 21/572 | 726/22 |
| 2023/0317193 A1* | 10/2023 | Alzheimer | G11C 29/12005 | |
| 2024/0012635 A1* | 1/2024 | Hallett | G06F 8/656 | |

* cited by examiner

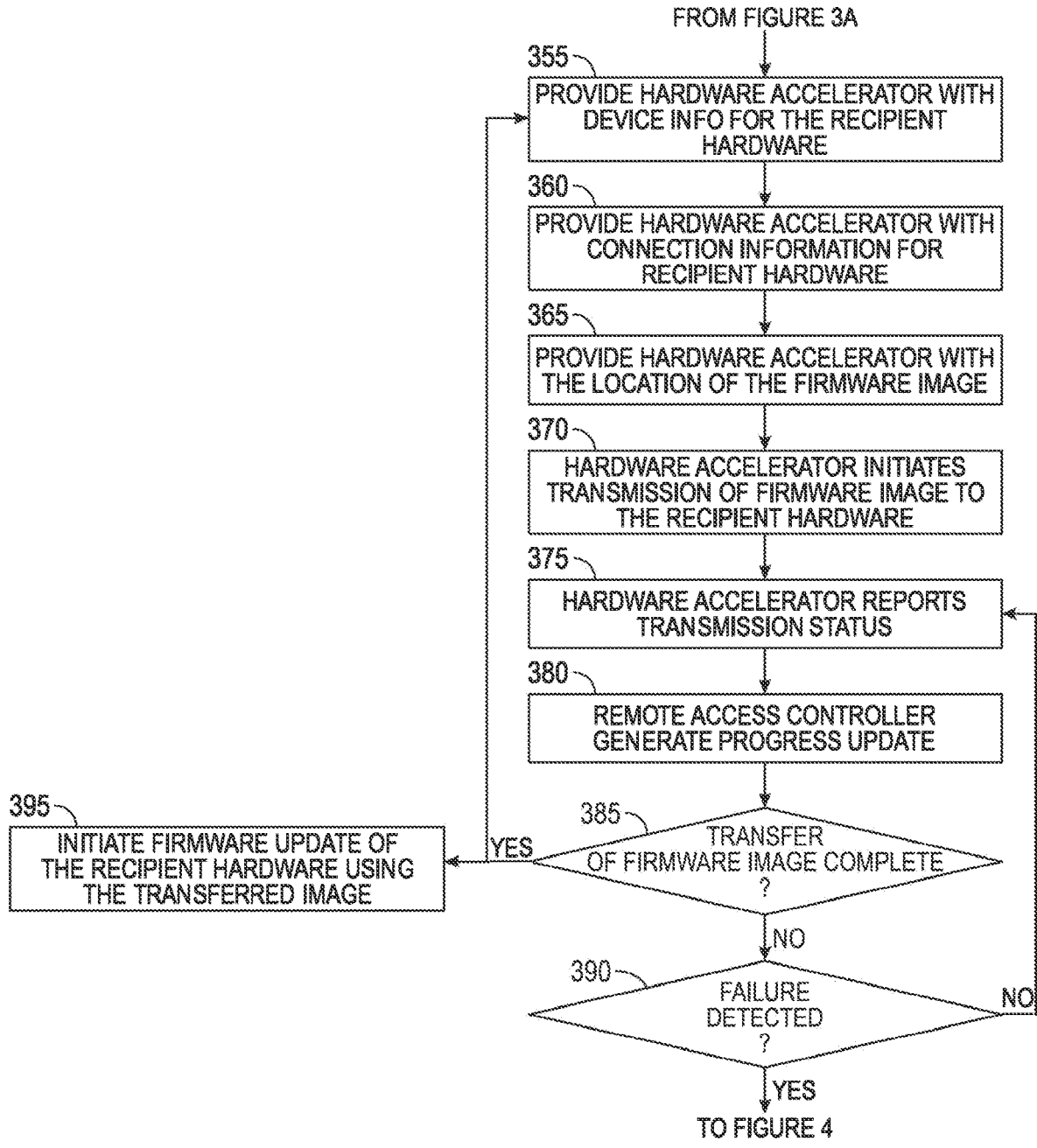

FROM FIGURE 3A

355
PROVIDE HARDWARE ACCELERATOR WITH DEVICE INFO FOR THE RECIPIENT HARDWARE

360
PROVIDE HARDWARE ACCELERATOR WITH CONNECTION INFORMATION FOR RECIPIENT HARDWARE

365
PROVIDE HARDWARE ACCELERATOR WITH THE LOCATION OF THE FIRMWARE IMAGE

370
HARDWARE ACCELERATOR INITIATES TRANSMISSION OF FIRMWARE IMAGE TO THE RECIPIENT HARDWARE

375
HARDWARE ACCELERATOR REPORTS TRANSMISSION STATUS

380
REMOTE ACCESS CONTROLLER GENERATE PROGRESS UPDATE

395
INITIATE FIRMWARE UPDATE OF THE RECIPIENT HARDWARE USING THE TRANSFERRED IMAGE

YES

385
TRANSFER OF FIRMWARE IMAGE COMPLETE ?

NO

390
FAILURE DETECTED ?

NO

YES

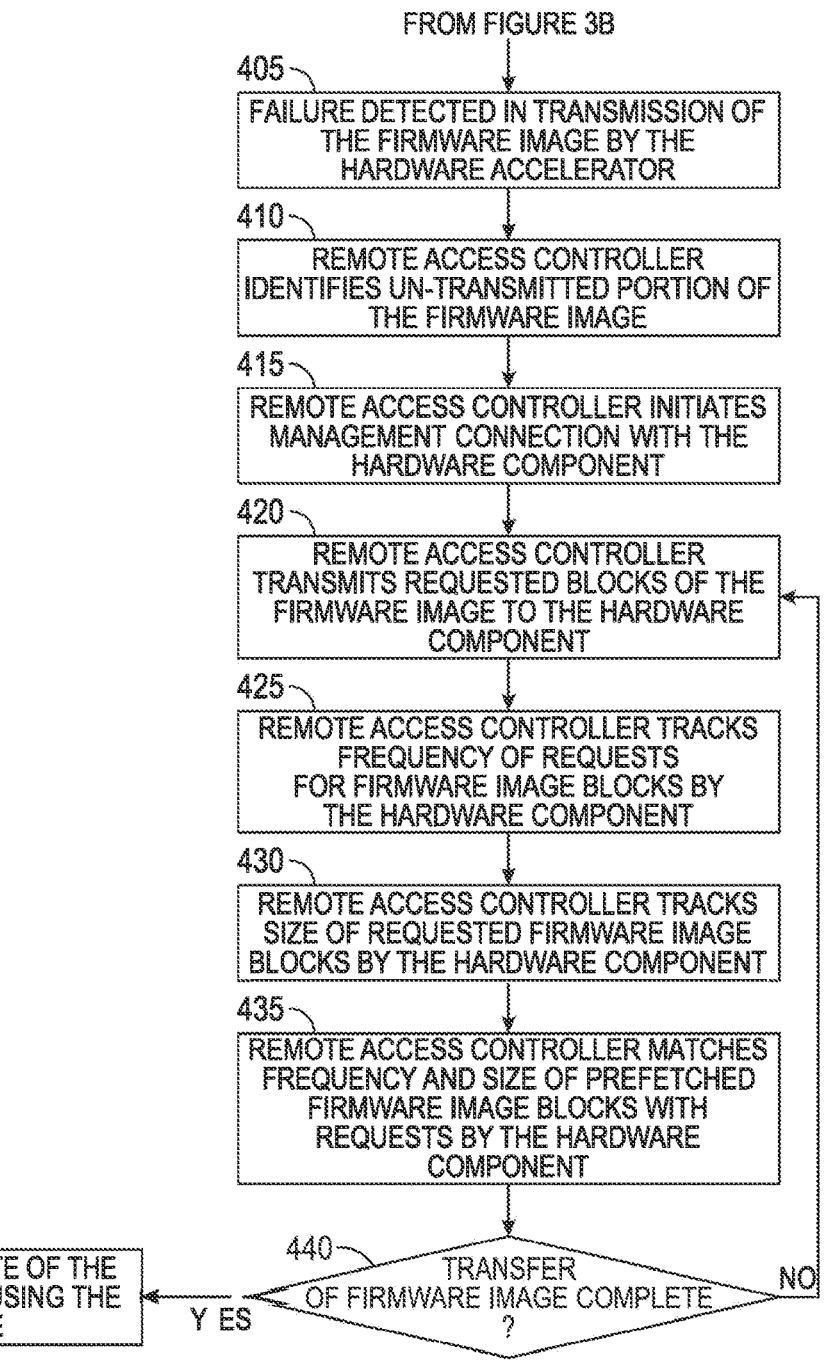

FROM FIGURE 3B

405 — FAILURE DETECTED IN TRANSMISSION OF THE FIRMWARE IMAGE BY THE HARDWARE ACCELERATOR

410 — REMOTE ACCESS CONTROLLER IDENTIFIES UN-TRANSMITTED PORTION OF THE FIRMWARE IMAGE

415 — REMOTE ACCESS CONTROLLER INITIATES MANAGEMENT CONNECTION WITH THE HARDWARE COMPONENT

420 — REMOTE ACCESS CONTROLLER TRANSMITS REQUESTED BLOCKS OF THE FIRMWARE IMAGE TO THE HARDWARE COMPONENT

425 — REMOTE ACCESS CONTROLLER TRACKS FREQUENCY OF REQUESTS FOR FIRMWARE IMAGE BLOCKS BY THE HARDWARE COMPONENT

430 — REMOTE ACCESS CONTROLLER TRACKS SIZE OF REQUESTED FIRMWARE IMAGE BLOCKS BY THE HARDWARE COMPONENT

435 — REMOTE ACCESS CONTROLLER MATCHES FREQUENCY AND SIZE OF PREFETCHED FIRMWARE IMAGE BLOCKS WITH REQUESTS BY THE HARDWARE COMPONENT

440 — TRANSFER OF FIRMWARE IMAGE COMPLETE? — NO

YES

445 — INITIATE FIRMWARE UPDATE OF THE HARDWARE COMPONENT USING THE FIRMWARE IMAGE

FIG. 4

SYSTEMS AND METHODS FOR FIRMWARE UPDATES USING HARDWARE ACCELERATORS

FIELD

The present disclosure relates generally to Information Handling Systems (IHSs), and relates more particularly to managing firmware used by IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Various hardware components of an IHS may operate using firmware instructions. From time to time, it is expected that firmware utilized by hardware components of an IHS may be updated. Such firmware updates may be made in order to modify the capabilities of a particular hardware component, such as to address security vulnerabilities or to adapt the operations of the hardware component to a specific computing task. When firmware updates are made to a hardware component of an IHS, it is preferable that the IHS experience no downtime and with minimal degradation in the performance of the IHS.

SUMMARY

In various embodiments, IHSs may include: one or more CPUs utilizing one or more PCIe (Peripheral Component Interconnect Express) buses that connect to at least one programmable hardware accelerator; a remote access controller supporting remote management of the IHS, the remote access controller comprising a logic unit and a memory device having instructions stored thereon that, upon execution by the logic unit, cause the remote access controller to: initiate an update of firmware that is used to operate a hardware component of the IHS; determine an availability of the hardware accelerator to transmit data to the hardware component of the IHS; delegate transmission of a firmware image to the hardware component by the hardware accelerator; and upon transmission of the firmware image by the hardware accelerator, update the firmware of the hardware component using the firmware image transmitted by the hardware accelerator.

In some IHS embodiments, the update of the firmware of the hardware component using the firmware image transmitted by the hardware accelerator is a rebootless update that does not include a reboot of the IHS. In some IHS embodiments, execution of the instructions further causes the remote access controller to: transmit firmware image data to the hardware accelerator, wherein the firmware image data comprises instructions for interfacing with the hardware component. In some IHS embodiments, the firmware image that is delegated for transmission by the first hardware accelerator is stored on a cloud resource, and wherein the firmware image data provided to the hardware accelerator by the remote access controller comprises an address from which to retrieve the firmware image stored by the cloud resource. In some IHS embodiments, the instructions provided by the remote access controller for interfacing with the hardware component comprise a bus address for interfacing directly with the hardware component. In some IHS embodiments, the instructions provided by the remote access controller for interfacing with the hardware component comprise a unique identifier for identifying the hardware component. In some IHS embodiments, execution of the instructions further causes the remote access controller to: prior to delegating transmission of the firmware image, authenticate the hardware component as authorized to interface directly with the hardware component. In some IHS embodiments, execution of the instructions further causes the remote access controller to: based on the authentication of the hardware accelerator, generate a credential for the hardware accelerator to present to hardware component, wherein the credential is comprised within the firmware image data provided to the hardware accelerator by the remote access controller. In some IHS embodiments, execution of the instructions further causes the remote access controller to: generate an inventory of a plurality of managed hardware components of the IHS; and identify the at least one programmable hardware accelerator within the inventory of managed hardware components of the IHS. In some IHS embodiments, the hardware accelerator generates periodic updates on a status of the transmission of the firmware image to the hardware component. In some IHS embodiments, execution of the instructions further causes the remote access controller to: based on the updates by the hardware accelerator, provide an administrator using a remote management interface with updates on progress in the update to the firmware of the hardware component. In some IHS embodiments, execution of the instructions further causes the remote access controller to: upon detecting a failure in the delegated transmission of the firmware image to the hardware component by the hardware accelerator, initiate recovery procedures for transmitting a remaining portion of the firmware image to the hardware component. In some IHS embodiments, the recovery procedures comprise transmitting the remaining portion of the firmware image via a management pathway coupling the remote access controller to the hardware component. In some IHS embodiments, the management pathway comprises a sideband signaling pathway utilized by the remote access controller in managing the hardware component.

In various additional embodiments, methods are provided for updating firmware used by a managed hardware component of an Information Handling System (IHS). The methods may include: initiating, by a remote access controller of the IHS that operates separate from one or more CPUs of the IHS and that provides remote management of the IHS, an update of firmware used to operate a hardware component of the IHS; detecting a programmable hardware accelerator within an inventory of managed hardware components of the IHS; determining an availability of the hardware accelerator to transmit data to the hardware component of the IHS; delegating transmission of a firmware image to the hardware component by the hardware accelerator; and upon transmission of the firmware image by the hardware accelerator, updating the firmware of the hardware component using the firmware image transmitted by the hardware accelerator.

In some method embodiments, the update of the firmware of the hardware component using the firmware image transmitted by the hardware accelerator is a rebootless update that does not include a reboot of the IHS. Some method embodiments may include transmitting firmware image data to the hardware accelerator, wherein the firmware image data comprises instructions for interfacing with the hardware component. In some method embodiments, the hardware accelerator generates periodic updates on a status of the transmission of the firmware image to the hardware component.

In various additional embodiments, remote access controllers support remote management of a plurality of managed hardware components of an Information Handling System (IHS). The remote access controllers may include: a logic unit and a memory device having instructions stored thereon that, upon execution by the logic unit, cause the remote access controller to: initiate an update of firmware used to operate a first of the plurality of hardware components of the IHS; detect a programmable hardware accelerator within an inventory of the plurality of managed hardware components of the IHS; determine an availability of the hardware accelerator to transmit data to the hardware component of the IHS; delegate transmission of a firmware image to the hardware component by the hardware accelerator; and upon transmission of the firmware image by the hardware accelerator, update the firmware of the hardware component using the firmware image transmitted by the hardware accelerator.

In some remote access controller embodiments, the update of the firmware of the hardware component using the firmware image transmitted by the hardware accelerator is a rebootless update that does not include a reboot of the IHS.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

FIG. 3B is a flowchart describing certain additional steps of methods, according to some embodiments, for using hardware accelerators to update firmware used by hardware components of an IHS.

FIG. 4 is a flowchart describing certain additional steps of a method, according to some embodiments, for error recovery during the use of hardware accelerators to update firmware used by hardware components of an IHS.

DETAILED DESCRIPTION

Figure 1:
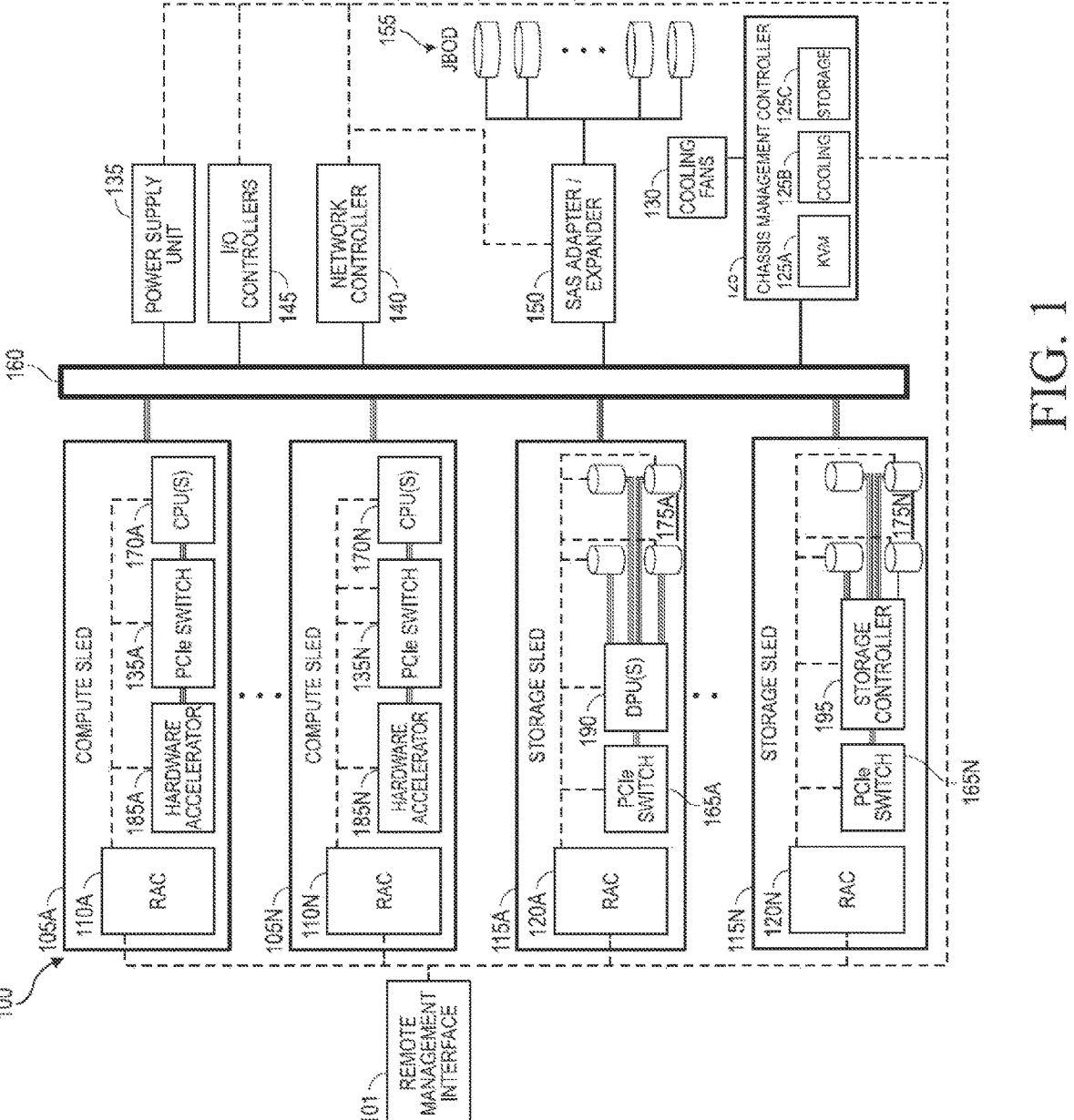
FIG. 1 is a diagram illustrating certain components of a chassis configured, according to some embodiments, for using hardware accelerators to update firmware used by IHSs installed in the chassis.

FIG. 1 is a block diagram illustrating certain components of a chassis 100 comprising one or more compute sleds 105a-n and one or more storage sleds 115a-n that may be configured to implement the systems and methods described herein for using hardware accelerators to update firmware used by IHSs installed in the chassis 100. Embodiments of chassis 100 may include a wide variety of hardware configurations in which one or more IHS 105a-n, 115a-n are installed in chassis 100. Such variations in hardware configuration may result from chassis 100 being factory assembled to include components specified by a customer that has contracted for manufacture and delivery of chassis 100. Upon delivery and deployment of a chassis 100, the chassis 100 may be modified by replacing and/or adding various hardware components, in addition to replacement of the removeable IHSs 105a-n, 115a-n that are installed in the chassis. In addition, once the chassis 100 has been deployed, firmware used by individual hardware components of the IHSs 105a-n, 115a-n, or by other hardware components of chassis 100, may be modified in order to update the operations that are supported by these hardware components.

Chassis 100 may include one or more bays that each receive an individual sled (that may be additionally or alternatively referred to as a tray, blade, and/or node) IHSs, such as compute sleds 105a-n and storage sleds 115a-n. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with different types of sleds, in some cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power and network bandwidth, to be shared by the compute sleds 105a-n and storage sleds 115a-n, thus providing efficiency improvements and supporting greater computational loads. For instance, certain computational tasks, such as computations used in machine learning and other artificial intelligence systems, may utilize computational and/or storage resources that are shared within an IHS, within an individual chassis 100 and/or within a set of IHSs that may be spread across multiple chassis of a data center.

Implementing computing systems that span multiple processing components of chassis 100 is aided by high-speed data links between these processing components, such as PCIe connections that form one or more distinct PCIe switch fabrics that are implemented by PCIe switches 135a-n, 165a-n installed in the IHSs 105a-n, 115a-n of the chassis. These high-speed data links may be used to support algorithm implementations that span multiple processing, networking and storage components of an IHS and/or chassis 100. For instance, computational tasks may be delegated to a specific processing component of an IHS, such as to a hardware accelerator 185*a-n* that may include one or more programmable processors that operate separate from the main CPUs 170*a-n* of computing sleds 105*a-n*. In various embodiments, such hardware accelerators 185*a-n* may include DPUs (Data Processing Units), GPUs (Graphics Processing Units), SmartNICs (Smart Network Interface Card) and/or FPGAs (Field Programmable Gate Arrays). These hardware accelerators 185*a-n* operate according to firmware instructions that may be occasionally updated, such as to adapt the capabilities of the respective hardware accelerators 185*a-n* to specific computing tasks. As described in additional detail below, embodiments support capabilities by which hardware accelerators 185*a-n* may be utilized in the delivery of firmware updates to other hardware components of chassis 100, thus reducing the time required to transmit the firmware updates to each of the hardware components being updated.

Chassis 100 may be installed within a rack structure that provides at least a portion of the cooling utilized by the IHSs 105*a-n*, 115*a-n* installed in chassis 100. In supporting airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air away from sleds 105*a-n*, 115*a-n* installed within the chassis. In this manner, a rack and a chassis 100 installed within the rack may utilize various configurations and combinations of cooling fans to cool the sleds 105*a-n*, 115*a-n* and other components housed within chassis 100.

The sleds 105*a-n*, 115*a-n* may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160 and between different components mounted on the printed circuit board of the backplane 160. In the illustrated embodiment, the connectors for use in coupling sleds 105*a-n*, 115*a-n* to backplane 160 include PCIe couplings that support high-speed data links with the sleds 105*a-n*, 115*a-n*. In various embodiments, backplane 160 may support various types of connections, such as cables, wires, midplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140, chassis management controller 125 and power supply unit 135.

Figure 2:
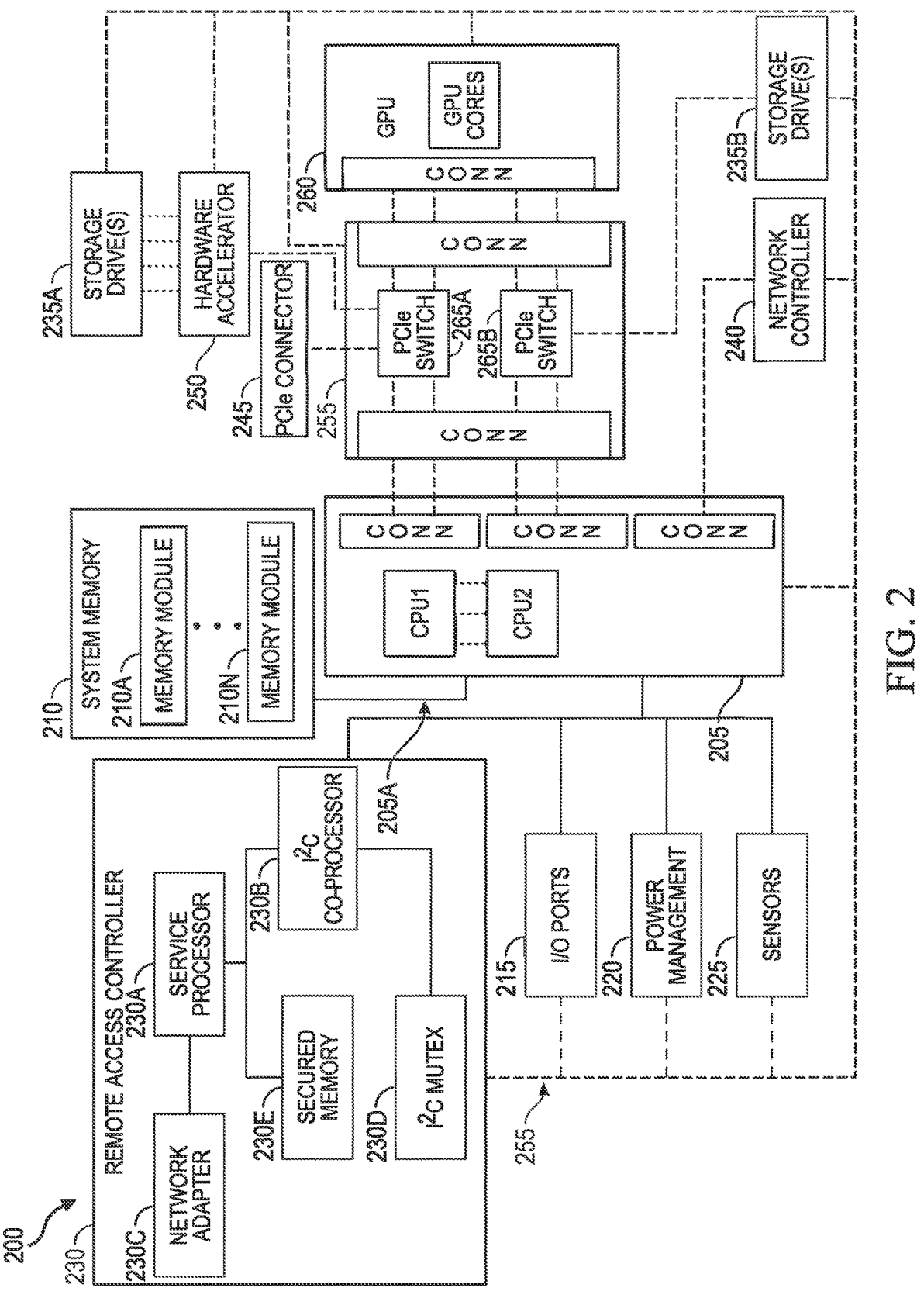
FIG. 2 is a diagram illustrating certain components of an IHS configured, according to some embodiments, for using hardware accelerators to update firmware used by hardware components of the IHS.

In certain embodiments, each individual sled 105*a-n*, 115*a-n-n* may be an IHS such as described with regard to IHS 200 of FIG. 2. Sleds 105*a-n*, 115*a-n* may individually or collectively provide computational processing resources that may be used to support a variety of e-commerce, multimedia, business and scientific computing applications, such as artificial intelligence systems provided via cloud computing implementations. Sleds 105*a-n*, 115*a-n* are typically configured with hardware and software that provide leading-edge computational capabilities. Accordingly, services that are provided using such computing capabilities are typically provided as high-availability systems that operate with minimum downtime.

In high-availability computing systems, such as may be implemented using embodiments of chassis 100, any downtime that can be avoided is preferred. As described above, firmware updates are an expected in the administration and operation of data centers, but it is preferable to avoid any downtime in making such firmware updates. For instance, in updating the firmware of the individual hardware components of the chassis 100, it is preferable that such updates can be made without having to reboot the chassis. It is also preferable that updates to the firmware of individual hardware components of sleds 105*a-n*, 115*a-n* be likewise made without having to reboot the respective sled of the hardware component that is being updated. Embodiments provide improved capabilities for implementing such rebootless updates by utilizing hardware accelerators 185*a-n* in reducing the time required to transmit firmware updates to hardware components. In addition, embodiments provided improved fault tolerance through capabilities by which a remote access controller 110*a-n*, 120*a-n* may delegate transmission of firmware updates to hardware accelerators 185*a-n* and may also implement fallback procedures for completing transmission of firmware updates to managed hardware components in scenarios where firmware transmissions delegated to hardware accelerators 185*a-n* cannot be completed.

As illustrated, each sled 105*a-n*, 115*a-n* includes a respective remote access controller (RAC) 110*a-n*, 120*a-n*. As described in additional detail with regard to FIG. 2, remote access controller 110*a-n*, 120*a-n* provides capabilities for remote monitoring and management of a respective sled 105*a-n*, 115*a-n* and/or of chassis 100. In support of these monitoring and management functions, remote access controllers 110*a-n* may utilize both in-band and side-band (i.e., out-of-band) communications with various managed components of a respective sled 105*a-n* and chassis 100. Remote access controllers 110*a-n*, 120*a-n* may collect various types of sensor data, such as collecting temperature sensor readings that are used in support of airflow cooling of the chassis 100 and the sleds 105*a-n*, 115*a-n*. In addition, each remote access controller 110*a-n*, 120*a-n* may implement various monitoring and administrative functions related to a respective sleds 105*a-n*, 115*a-n*, where these functions may be implemented using sideband bus connections with various internal components of the chassis 100 and of the respective sleds 105*a-n*, 115*a-n*. As described in additional detail below, in various embodiments, these capabilities of the remote access controllers 110*a-n*, 120*a-n* may be utilized in updating the firmware of hardware components of chassis 100 and/or of hardware components of the sleds 110*a-n*, 120*a-n*, without having to reboot the chassis or any of the sleds 110*a-n*, 120*a-n*. In embodiments, remote access controllers 110*a-n*, 120*a-n* may implement procedures updating firmware utilized by managed components of chassis 100.

The remote access controllers 110*a-n*, 120*a-n* that are present in chassis 100 may support secure connections with a remote management interface 101. In some embodiments, remote management interface 101 provides a remote administrator with various capabilities for remotely administering the operation of an IHS, including initiating updates to the firmware used by hardware components installed in the chassis 100. For example, remote management interface 101 may provide capabilities by which an administrator can initiate updates to the firmware utilized by all of the storage drives 175*a-n* installed in a chassis 100, or to the firmware utilized by all of the storage drives 175*a-n* of a particular model or manufacturer. In some instances, remote management interface 101 may include an inventory of the hardware, software and firmware of chassis 100 that is being remotely managed through the operation of the remote access controllers 110*a-n*, 120*a-n*. The remote management interface 101 may also include various monitoring interfaces for evaluating telemetry data collected by the remote access controllers 110*a-n*, 120*a-n*. In some embodiments, remote management interface 101 may communicate with remote access controllers 110*a-n*, 120*a-n* via a protocol such the Redfish remote management interface.

In the illustrated embodiment, chassis 100 includes one or more compute sleds 105*a-n* that are coupled to the backplane 160 and installed within one or more bays or slots of chassis 100. Each of the individual compute sleds 105*a-n* may be an IHS, such as described with regard to FIG. 2. Each of the individual compute sleds 105*a-n* may include various different numbers and types of processors that may be adapted to performing specific computing tasks. In the illustrated embodiment, each of the compute sleds 105*a-n* includes a PCIe switch 135*a-n* that provides access to a hardware accelerator 185*a-n*, such as the described DPUs, GPUs, Smart NICs and FPGAs, that may be programmed and adapted for specific computing tasks, such as to support machine learning or other artificial intelligence systems. Compute sleds 105*a-n* may include a variety of hardware components, such as hardware accelerator 185*a-n* and PCIe switches 135*a-n*, that operate using firmware that may be occasionally updated.

As illustrated, chassis 100 includes one or more storage sleds 115*a-n* that are coupled to the backplane 160 and installed within one or more bays of chassis 100 in a similar manner to compute sleds 105*a-n*. Each of the individual storage sleds 115*a-n* may include various different numbers and types of storage devices. As described in additional detail with regard to FIG. 2, a storage sled 115*a-n* may be an IHS 200 that includes multiple solid-state drives (SSDs) 175*a-n*, where the individual storage drives 175*a-n* may be accessed through a PCIe switch 165*a-n* of the respective storage sled 115*a-n*.

As illustrated, a storage sled 115*a* may include one or more DPUs (Data Processing Units) 190 that is a hardware accelerator that provides access to and manages the operations of the storage drives 175*a* of the storage sled 115*a*. Use of a DPU 190 in this manner provides low-latency and high-bandwidth access to numerous SSDs 175*a*. These SSDs 175*a* may be utilized in parallel through NVMe transmissions that are supported by the PCIe switch 165*a* that connects the SSDs 175*a* to the DPU 190. In some instances, PCIe switch 165*a* may be in integrated component of a DPU 190. The immense data storage and retrieval capabilities provided by such storage sled 115*a* implementations may be harnessed by offloading storage operations directed as storage drives 175*a* to a DPU 190*a*, and thus without relying on the main CPU of the storage sled, or of any other component of chassis 100. As indicated in FIG. 1, chassis 100 may also include one or more storage sleds 115*n* that provide access to storage drives 175*n* via a storage controller 195. In some embodiments, storage controller 195 may provide support for RAID (Redundant Array of Independent Disks) configurations of logical and physical storage drives, such as storage drives provided by storage sled 115*n*. In some embodiments, storage controller 195 may be a HBA (Host Bus Adapter) that provides more limited capabilities in accessing storage drives 175*n*.

In addition to the data storage capabilities provided by storage sleds 115*a-n*, chassis 100 may provide access to other storage resources that may be installed components of chassis 100 and/or may be installed elsewhere within a rack that houses the chassis 100. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that, in some instances, may be configured and managed individually and without implementing data redundancy across the various drives 155. The additional storage resources 155 may also be at various other locations within a datacenter in which chassis 100 is installed.

In light of the various manners in which storage drives 175*a-n*, 155 may be coupled to chassis 100, a wide variety of different storage topologies may be supported. Through these supported topologies, storage drives 175*a-n*, 155 may be logically organized into clusters or other groupings that may be collectively tasked and managed. In some instances, a chassis 100 may include numerous storage drives 175*a-n*, 155 that are identical, or nearly identical, such as arrays of SSDs of the same manufacturer and model. Accordingly, any firmware updates to storage drives 175*a-n*, 155 requires the updates to be applied within each of these topologies being supported by the chassis 100. Despite the large number of different storage drive topologies that may be supported by an individual chassis 100, the firmware used by each of these storage devices 175*a-n*, 155 may be occasionally updated. In some instances, firmware updates may be limited to a single storage drive, but in other instances, a set of firmware updates may be initiated for a large number of storage drives, such as for all SSDs installed in chassis 100.

In some instances, errors encountered during updates to the firmware of one hardware component of a chassis 100, may preclude or delay any additional firmware updates to other hardware components of the chassis. For example, a set of updates to the firmware utilized by twenty-five identical SSDs installed in chassis 100 may be serialized in order to support fault tolerance with respect to possible data loss. When sets of such firmware updates are serialized, any errors that are encountered during updates to the firmware of any of these SSDs prevents, or at least delays, any additional firmware updates to the remaining SSDs. This prevents data loss from multiple SSDs being simultaneously rendered inoperable due to failures in the updates for the firmware of the SSDs. Addressing such problems that may occur during firmware updates, embodiments support use of hardware accelerators 185*a-n* to provide expedited delivery of firmware updates to managed hardware components, thus reducing the time required to transmit updates. Additionally, embodiments provide fault tolerance in supporting error recovery procedures when expedited transmission of firmware updates cannot be completed.

As illustrated, the chassis 100 of FIG. 1 includes a network controller 140 that provides network access to the sleds 105*a-n*, 115*a-n* installed within the chassis. Network controller 140 may include various switches, adapters, controllers and couplings used to connect chassis 100 to a network, either directly or via additional networking components and connections provided via a rack in which chassis 100 is installed. Network controller 140 operates according to firmware instructions that may be occasionally updated.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. Power supply unit 135 may operate according to firmware instructions that may be occasionally updated.

Chassis 100 may also include various I/O controllers 140 that may support various I/O ports, such as USB ports that may be used to support keyboard and mouse inputs and/or video display capabilities. Each of the I/O controllers 140 may operate according to firmware instructions that may be occasionally updated. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the JBOD 155.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured to implement systems and methods described herein for using hardware accelerators to update firmware used by hardware components of the IHS 200. It should be appreciated that although the embodiments described herein may describe an IHS that is a compute sled or similar computing component that may be deployed within the bays of a chassis, a variety of other types of IHSs, such as laptops and portable devices, may also operate according to embodiments described herein. In the illustrative embodiment of FIG. 2, IHS 200 may be a computing component, such as sled 105a-n, 115a-n or other type of server, such as an 1RU server installed within a 2RU chassis, that is configured to share infrastructure resources provided within a chassis 100.

IHS 200 may utilize one or more system processors 205, that may be referred to as CPUs (central processing units). In some embodiments, CPUs 205 may each include a plurality of processing cores that may be separately delegated with computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory bus 205a. The system memory 210 is coupled to CPUs 205 via one or more memory buses 205a that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line busses. For instance, CPUs 205 may also be coupled to a power management unit 220 that may interface with a power system of the chassis 100 in which IHS 200 may be installed. In addition, CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or adapter that is coupled to a connector (e.g., PCIe connector of a motherboard, backplane, midplane, etc.) of IHS 200. In some embodiments, network controller 240 may support high-bandwidth network operations by the IHS 200 through a PCIe interface that is supported by the chipset of CPUs 205. Network controller 240 may operate according to firmware instructions that may be occasionally updated.

In some embodiments, network controller 240 may be a SmartNIC that includes programmable capabilities for use in offloading the processing of certain functions, such as signal processing operations or machine learning computations, from CPUs 205. In some instances, the programmable capabilities of a SmartNIC 240 may be modified through updated firmware instructions that are pushed to the Smart-NIC 240. As described in additional below, embodiments may utilize programmable capabilities of SmartNIC 240 in delegating transmission of firmware updates to managed hardware components of IHS 200, thus reducing the time required to transmit the firmware updates to these hardware components.

As indicated in FIG. 2, in some embodiments, CPUs 205 may be coupled to a PCIe card 255 that includes two PCIe switches 265*a-b* that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265*a-b*, different embodiments may operate using different numbers of CPUs and PCIe switches. In addition to serving as I/O controllers that route PCIe traffic, PCIe switches 265*a-b* include switching logic that can be used to expand the number of PCIe connections that are supported by CPUs 205. PCIe switches 265*a-b* may multiply the number of PCIe lanes available to CPUs 205, thus allowing more PCIe devices to be connected to CPUs 205, and for the available PCIe bandwidth to be allocated with greater granularity. Each of the PCIe switches 265*a-b* may operate according to firmware instructions that may be occasionally updated.

Using the available PCIe lanes, the PCIe switches 265*a-b* may be used to implement a PCIe switch fabric. Also through this switch fabric, PCIe NVMe (Non-Volatile Memory Express) transmission may be supported and utilized in high-speed communications with SSDs, such as storage drives 235*a-b*, of the IHS 200. Also through this switch fabric, PCIe VDM (Vendor Defined Messaging) may be supported and utilized in managing PCIe-compliant hardware components of the IHS 200, such as in updating the firmware utilized by the hardware components.

As indicated in FIG. 2, IHS 200 may support storage drives 235*a-b* in various topologies, in the same manner as described with regard to the chassis 100 of FIG. 1. In the illustrated embodiment, storage drives 235*a* are accessed via a hardware accelerator 250, while storage drives 235*b* are accessed directly via PCIe switch 265*b*. In some embodiments, the storage drives 235*a-b* of IHS 200 may include a combination of both SSD and magnetic disk storage drives. In other embodiments, all of the storage drives 235*a-b* of IHS 200 may be identical, or nearly identical. In all embodiments, storage drives 235*a-b* operate according to firmware instructions that may be occasionally updated.

As illustrated, PCIe switch 265*a* is coupled via a PCIe link to a hardware accelerator 250, such as a DPU, Smart-NIC, GPU and/or FPGA, that may be a connected to the IHS via a removeable card or baseboard that couples to a PCIe connector of the IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, that may be used to implement functions used to support devices coupled to the IHS 200. In some embodiments, the processing cores of hardware accelerator 250 include ARM (advanced RISC (reduced instruction set computing) machine) processing cores. In other embodiments, the cores of DPUs 250*a-b* may include MIPS (microprocessor without interlocked pipeline stages) cores, RISC-V cores, or CISC (complex instruction set computing) (i.e., ×86) cores. The programmable capabilities of hardware accelerator 250 may operate according to firmware instructions that may be occasionally updated. In some embodiments, the programmable capabilities of hardware accelerator 250 may be modified by a remote access controller 230 in delegating transmission of firmware updates to managed hardware components of IHS 200, thus reducing the time required to transmit the firmware updates to these hardware components.

In the illustrated embodiment, the programmable capabilities of hardware accelerator 250 implement functions used to support storage drives 235*a*, such as SSDs. In such storage drive topologies, hardware accelerator 250 may implement processing of PCIe NVMe communications with SSDs 235*a*, thus supporting high-bandwidth connections with these SSDs. Hardware accelerator 250 may also include one more memory devices used to store program instructions executed by the processing cores and/or used to support the operation of SSDs 235*a* such as in implementing cache memories and buffers utilized in support high-speed operation of these storage drives, and in some cases may be used to provide high-availability and high-throughput implementations of the read, write and other I/O operations that are supported by these storage drives 235*a*. In other embodiments, hardware accelerator 250 may implement operations in support of other types of devices and may similarly support high-bandwidth PCIe connections with these devices. For instance, in various embodiments, hardware accelerator 250 may support high-bandwidth connections, such as PCIe connections, with networking devices in implementing functions of a network switch, compression and codec functions, virtualization operations or cryptographic functions. As described in additional detail below, embodiments may utilize such PCIe communication capabilities of hardware accelerators 185*a-n* to expedite the delivery of firmware updates to other hardware components of chassis 100, thus reducing the time required to transmit the firmware updates to each of the hardware components being updated.

As illustrated in FIG. 2, PCIe switches 265*a-b* may also support PCIe couplings with one or more GPUs (Graphics Processing Units) 260. Embodiments may include one or more GPU cards, where each GPU card is coupled to one or more of the PCIe switches 265*a-b*, and where each GPU card may include one or more GPUs 260. In some embodiments, PCIe switches 265*a-b* may transfer instructions and data for generating video images by the GPUs 260 to and from CPUs 205. Accordingly, GPUs 260 may include on or more hardware-accelerated processing cores that are optimized for performing streaming calculation of vector data, matrix data and/or other graphics data, thus supporting the rendering of graphics for display on devices coupled either directly or indirectly to IHS 200. In some instances, GPUs may be utilized as programmable computing resources for offloading other functions from CPUs 205, in the same manner as hardware accelerator 250. GPUs 260 may operate according to firmware instructions that may be occasionally updated. As with hardware accelerator 250 and SmartNIC 240, the programmable capabilities of GPUs 260 may be utilized in the delivery of firmware updates to other hardware components of chassis 100, thus reducing the time required to transmit the firmware updates to each of the hardware components being updated.

As illustrated in FIG. 2, PCIe switches 265*a-b* may support PCIe connections in addition to those utilized by GPUs 260 and hardware accelerator 250, where these connections may include PCIe links of one or more lanes. For instance, PCIe connectors 245 supported by a printed circuit board of IHS 200 may allow various other systems and devices to be coupled to IHS. Through couplings to PCIe connectors 245*a*, a variety of data storage devices, graphics processors and network interface cards may be coupled to IHS 200, thus supporting a wide variety of topologies of devices that may be coupled to the IHS 200.

As described, IHS 200 includes a remote access controller 230 that supports remote management of IHS 200 and of various internal components of IHS 200. In certain embodiments, remote access controller 230 may operate from a different power plane from the processors 205 and other components of IHS 200, thus allowing the remote access controller 230 to operate, and management tasks to proceed, while the processing cores of IHS 200 are powered off. Various functions provided by the BIOS, including launching the operating system of the IHS 200, and/or functions of a TPM may be implemented or supplemented by the remote access controller 230. In some embodiments, the remote access controller 230 may perform various functions to verify the integrity of the IHS 200 and its hardware components prior to initialization of the operating system of IHS 200 (i.e., in a bare-metal state). In some embodiments, certain operations of the remote access controller 230, such as the operations described herein for updating firmware used by managed hardware components of IHS 200, may operate using validated instructions, and thus within the root of trust of IHS 200.

In some embodiments, remote access controller 230 may include a service processor 230*a*, or specialized microcontroller, that operates management software that supports remote monitoring and administration of IHS 200. The management operations supported by remote access controller 230 may be remotely initiated, updated and monitored via a remote management interface 101, such as described with regard to FIG. 1. Remote access controller 230 may be installed on the motherboard of IHS 200 or may be coupled to IHS 200 via an expansion slot or other connector provided by the motherboard. In some instances, the management functions of the remote access controller 255 may utilize information collected by various managed sensors 225 located within the IHS. For instance, temperature data collected by sensors 225 may be utilized by the remote access controller 230 in support of closed-loop airflow cooling of the IHS 200.

As indicated, remote access controller 230 may include a secured memory 230*e* for exclusive use by the remote access controller in support of management operations. In embodiments, firmware updates for managed hardware components 205, 235*a-b*, 240, 250, 255, 260 are received and managed by remote access controller 230. In some instances, received firmware updates may be temporarily stored in the secured memory 230*e* of remote access controller 230. However, many firmware updates may require transmission of firmware images that are relatively large in size such that they cannot be accommodated in the secured memory 230*e*, or cannot be accommodated without monopolizing all available storage space in the secured memory 230*e*. Current firmware updates are tens of megabytes in size and firmware updates that are greater by one or two orders of magnitude are expected. Accordingly, embodiments support delegation of the transmission of firmware updates by a hardware accelerator 250, GPU 260 or SmartNIC 240, where the superior transmission capabilities of these hardware accelerators allows firmware updates to be transmitted to managed hardware components 205, 235*a-b*, 240, 250, 255, 260 more quickly than is possible using communication capabilities of remote access controller 230.

Additionally, as described in additional detail below, embodiments may also support failover procedures by which remote access controller 230 may resume transmission of a firmware image to a managed hardware component 205, 235*a-b*, 240, 250, 255, 260 when delegated transmission by a hardware accelerator 240, 250, 260 cannot be completed. As described in additional detail below, such failover procedures implemented by remote access controller 230 may utilize a fixed portion of secured memory 230*e* in transmitting the remaining portion of a partially transmitted firmware update to a managed hardware component as efficiently as possible using the communication pathways available to the remote access controller.

In some embodiments, remote access controller 230 may implement monitoring and management operations using MCTP (Management Component Transport Protocol) messages that may be communicated to managed devices 205, 235a-b, 240, 250, 255, 260 via management connections supported by a sideband bus 255. In some instances, the sideband management connections supported by remote access controller 230 may include PLDM (Platform Level Data Model) management communications with the managed devices 205, 235a-b, 240, 250, 255, 260 of IHS 200. In some embodiments, the remote access controller 230 may additionally or alternatively use MCTP messaging to transmit Vendor Defined Messages (VDMs) via the in-line PCIe switch fabric supported by PCIe switches 265a-b.

As illustrated, remote access controller 230 may include a network adapter 230c that provides the remote access controller with network access that is separate from the network controller 240 utilized by other hardware components of the IHS 200. Through secure connections supported by network adapter 230c, remote access controller 230 communicates management information with remote management interface 101. In support of remote monitoring functions, network adapter 230c may support connections between remote access controller 255 and external management tools using wired and/or wireless network connections that operate using a variety of network technologies. As a non-limiting example of a remote access controller, the integrated Dell Remote Access Controller (iDRAC) from Dell® is embedded within Dell servers and provides functionality that helps information technology (IT) administrators deploy, update, monitor, and maintain servers remotely.

Remote access controller 230 supports monitoring and administration of the managed devices of an IHS via a sideband bus interface 255. For instance, messages utilized in device and/or system management may be transmitted using I2C sideband bus 255 connections that may be individually established with each of the respective managed devices 205, 235a-b, 240, 250, 255, 260 of the IHS 200 through the operation of an I2C multiplexer 230d of the remote access controller. As illustrated in FIG. 2, the managed devices 205, 235a-b, 240, 250, 255, 260 of IHS 200 are coupled to the CPUs 205, either directly or directly, via in-line buses that are separate from the I2C sideband bus 255 connections used by the remote access controller 230 for device management.

In certain embodiments, the service processor 230a of remote access controller 230 may rely on an I2C co-processor 230b to implement sideband I2C communications between the remote access controller 230 and the managed hardware components 205, 235a-b, 240, 250, 255, 260 of the IHS 200. The I2C co-processor 230b may be a specialized co-processor or micro-controller that is configured to implement a I2C bus interface used to support communications with managed hardware components 205, 235a-b, 240, 250, 255, 260 of IHS. In some embodiments, the I2C co-processor 230b may be an integrated circuit on the same die as the service processor 230a, such as a peripheral system-on-chip feature that may be provided by the service processor 230a. The sideband I2C bus 255 is illustrated as single line in FIG. 2. However, sideband bus 255 may be comprises of multiple signaling pathways, where each may be comprised of a clock line and data line that couple the remote access controller 230 to I2C endpoints 205, 235a-b, 240, 250, 255, 260.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3A:
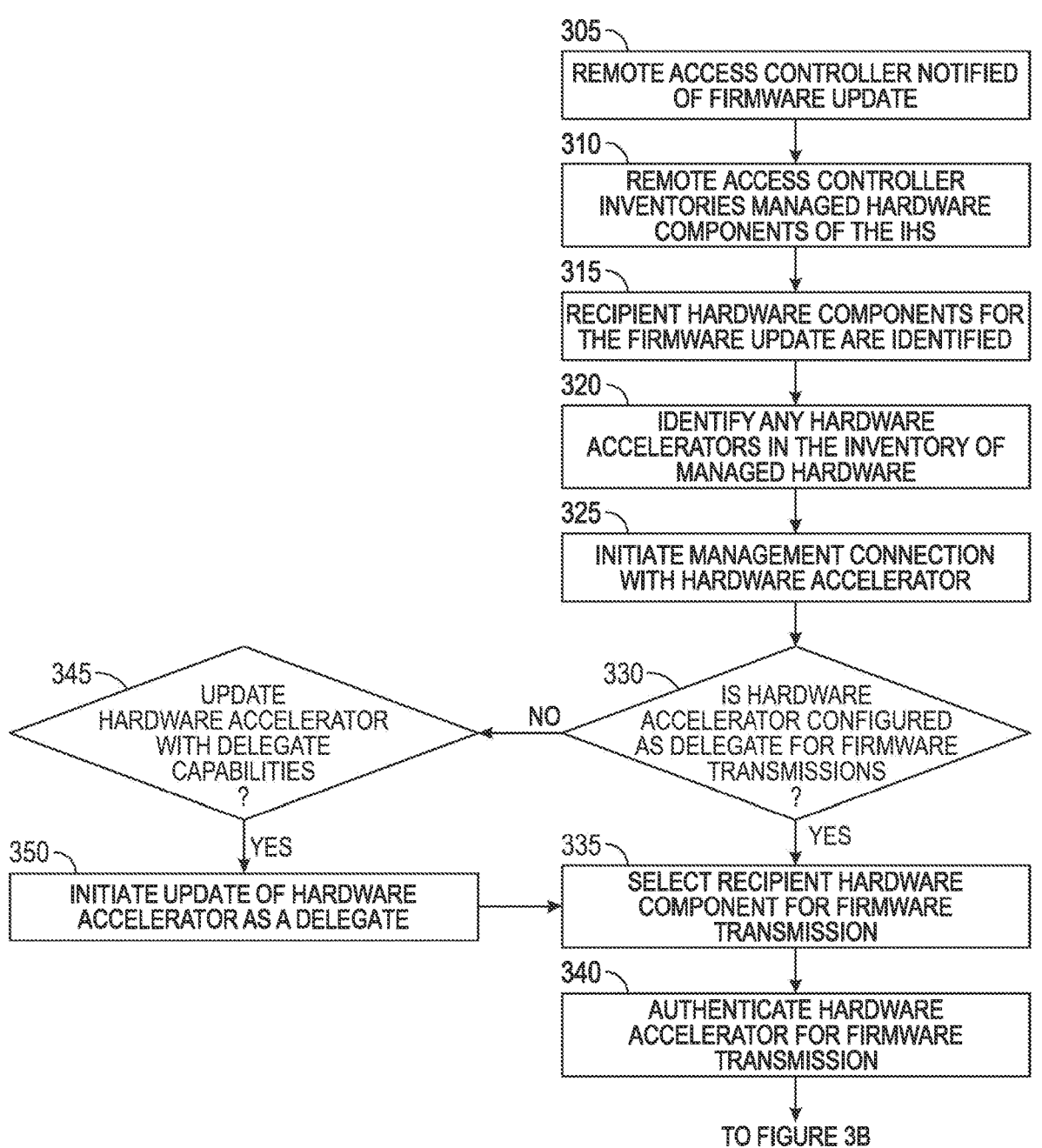
FIG. 3A is a flowchart describing certain steps of a method, according to some embodiments, for using hardware accelerators to update firmware used by hardware components of an IHS.

FIG. 3A is a flowchart describing certain steps of a method, according to some embodiments, for using hardware accelerators to update firmware used by hardware components of an IHS, such as the IHSs described with regard to FIGS. 1 and 2. Embodiments may begin, at 305, with the receipt of a notification that updated firmware is available for a managed hardware component of an IHS. As described above, an IHS may include a remote access controller that provides remote management of an IHS, and in many instances, also provides remote management of individual hardware components of an IHS. In embodiments, such a remote access controller of an IHS is tasked with updating firmware that is utilized by managed hardware components of the IHS.

As described, data center administrators may utilize remote management tools to push firmware updates to managed hardware components operating within the data center. For example, a data center administrator may initiate operations for updating the firmware utilized by all SSDs of a certain type within a chassis (that may include over 20 SSDs), where the firmware update may be initiated in order to address a security vulnerability in a particular type of SSD, such as SSDs of a specific model number. Such types of firmware updates may be pushed to the remote access controllers of the IHSs that include the particular type of hardware component that meet the criteria set forth for the firmware update, with the remote access controllers then responsible for completing the updates to the firmware of managed hardware components of the IHS.

Once a notification of updates to the firmware of a managed component of an IHS has been received, at 310, the remote access controller may generate an inventory of the managed hardware components of the IHS. In some embodiments, the remote access controller may generate this inventory through the broadcast of management commands via inband and sideband buses available to the remote access controller, such as the signaling pathways described with regard to the remote access controller 230 of FIG. 2. For instance, PLDM broadcasts on I2C sideband management buses and on certain inband buses may generate responses from all of the initialized hardware components that may be managed, in full or in part, by the remote access controller.

Using this inventory of managed hardware components, at 315, the remote access controller identifies hardware components to which the firmware update is potentially applicable. In some embodiments, the remote access controller may compare model number information included in the update notification to model numbers of hardware components from the collected inventory to determine the hardware components that may be operated using the updated firmware. Embodiments may additionally or alternatively utilize various types of information included in the update notification or information queried from the cloud system where the firmware image is stored in order to identify hardware components that may be operated using the updated firmware. However, in order for the update to proceed, the firmware image must be transmitted to a local storage of the respective hardware components.

Firmware images may be relatively large files that may take several minutes to transmit to the managed hardware component, especially when transmitting the file using some of the sideband signaling pathways supported by a remote access controller. If the firmware image is transmitted solely over a relatively low bandwidth sideband management bus, a firmware image may take tens of minutes to transmit to a hardware component. During this interval during which the firmware image is being transmitted, numerous types of errors can occur in the IHS, elsewhere within a shared chassis, in the remote access controller, in the managed hardware component and/or in another hardware component that shares use of the signaling pathway being used to transmit the firmware image. Due to such errors, transmission of the firmware image may leave the managed hardware component in an undefined and/or inoperable state that requires manual administration of the device, and in some instances, may render the hardware component as permanently inoperable. Accordingly, rapid transmission of a firmware update to a hardware component serves to reduce the opportunities for errors that require manual intervention, or that otherwise remove an IHS from service.

In order to provide more rapid transmission of firmware updates to managed hardware components, at 320, the remote access controller identifies any hardware accelerators within the collected inventory of managed hardware. In some embodiments, hardware accelerators may be identified based on distinctive announcements that are multicast on one or more busses of the IHS by hardware accelerators in broadcasting the availability of the programmable processing capabilities of the hardware accelerators. In some embodiments, hardware accelerators may be identified based on various queries by the remote access controller and/or based on identifiers associated with the device, such as model number information.

Once a hardware accelerator has been identified within the inventory of managed hardware components, at 325, the remote access controller may initiate a management connection with the identified hardware accelerator. At 330, the remote access controller determines whether the hardware accelerator is configured to serve as a delegate for firmware transmissions according to the embodiments described herein. In some embodiments, the capability of the hardware accelerator to support embodiments may be determined based on detecting a broadcast by a firmware delegation service that is operating on the hardware accelerator. In such scenarios, instructions for operating the firmware delegation service have been previously provided to the hardware accelerator and the hardware has initialized the firmware delegation service using these instructions.

As indicated in FIG. 3A, in scenarios where no firmware delegation service is detected as operating on the hardware accelerator, at 345, the remote access controller determines whether the hardware accelerator can be updated to operate the firmware delegation service using the programmable capabilities of the hardware accelerator. In scenarios where the hardware accelerator can be programmed to support the firmware delegation service, at 350, the remote access controller provides the hardware accelerator with instructions for initializing and running the firmware delegation service. Embodiments may pause the firmware transmission until the hardware accelerator has been updated and has initialized the firmware delegation service.

With the firmware delegation service operating on the hardware accelerator, at 335, the remote access controller selects a hardware component from the collected inventory to be updated with the firmware image specified in the notification of the firmware update. Various techniques may be utilized for ordering the firmware updates to the hardware components that have been selected for receiving the update. Once a hardware component has been selected for transmission of the firmware image, at 340, the remote access controller authenticates the hardware accelerator for delegation of a firmware transmission to the selected hardware component. In some embodiments, the remote access controller may present the hardware accelerator with differing authentication requirements in accordance with differing authentication standards utilized by the various managed hardware components of an IHS that may receive firmware updates according to embodiments described herein. In some embodiments, the remote access controller may generate an authentical credential, such as a nonce or cryptographic token, that is provided to the hardware accelerator and used by the hardware component to authenticate the hardware component prior to accepting firmware instructions from the hardware accelerator. In some embodiments, the credentials provided to the hardware accelerator by the remote access controller may be used by the cloud resource storing the firmware update in order to authenticate requests by the hardware accelerator to access the firmware image.

Embodiments continue at 355 of FIG. 3B with the remote access controller also providing the firmware delegation service operating on the hardware accelerator with device information describing the hardware component for which the firmware transmission has been delegated to the hardware accelerator. For instance, the device information may specify information such as unique identifiers for the hardware component, the version of firmware that is currently in use by hardware components and/or other firmware locally stored by the hardware component. Embodiments may continue, at 360, with the remote access controller providing the firmware delegation service with information for establishing a direct coupling with the hardware component. In scenarios where the hardware accelerator will utilize a PCIe connection in order to transmit the firmware image to the hardware components, the connection information provided by the remote access controller may specify a BDF (Bus Device Function) identifier used for identifying the hardware component in PCIe communications, such as those supported by the PCIe switch fabric of the IHS. In scenarios where the hardware accelerator will utilize an I2C or I3C connection to transmit the firmware image, the connection information may specify an endpoint ID used to address the hardware component on the I2C or I3C bus.

At 365, the remote access controller provides the hardware accelerator with the location of the firmware image. In some embodiments, this location may be specified in the notification of the firmware update that was provided to the remote access controller. In some embodiments, the location may be an address or resource locator of a cloud resource at which the firmware image is stored and available for downloading by the hardware accelerator. At 370, the hardware accelerator initiates transmission of the firmware image from the specified storage location to a local storage of the hardware component. In some instances, the hardware accelerator may be coupled to the hardware component, such as an SSD, through one or more dedicated lanes of PCIe bandwidth, thus providing the capability for a firmware image to be transferred at a high rate to the managed hardware component.

Despite the significant bandwidth that may be available to the hardware accelerator in transmitting the firmware image to hardware component, some firmware images can be of considerable size, thus providing opportunity for failures during the transmission of the firmware image. Accordingly, as indicated in FIG. 3, at 375, the hardware accelerator may issue periodic reports providing a status of the firmware transmission. This status may specify a percentage of the firmware image that has been successfully transmitted to the hardware component. In other instances, this status may specify only that the transmission of the firmware image is ongoing and that no errors have been encountered. Based on this status information provided by the hardware accelerator, at 380, the remote access controller may generate a progress update that specifies the progress in updating the firmware of the hardware component, and/or the progress in updating the firmware of all of the hardware components selected for updating. In some embodiments, this progress update may be presented to a data center administrator via a graphical interface of a remote management interface, such as described with regard to FIG. 1.

As indicated in FIG. 3B, at 385, the remote access controller periodically checks whether the delegated transmission of the firmware image to the hardware component has been completed. As described, various types of errors may arise during transmission of the firmware image, such as errors in the signaling pathway used to transmit the image, errors in other hardware components of the IHS sharing the signaling pathway and that render the signaling pathway inoperable and/or errors in the managed hardware component to which the firmware is being transmitted. Accordingly, the remote access controller, the hardware accelerator and the managed device monitor for errors, at 390, during transmission of the firmware image by the hardware accelerator.

In some instances, errors during transmission of the firmware image may be indicated by a lack of periodic progress updates from the hardware accelerator. In such instances, the remote access controller may initiate diagnostic queries to the hardware accelerator, the managed device, and/or the bus being used to transmit the firmware image in order to identify the error and to initiate failover procedures. If no errors are encountered, embodiments continue, at 375, with the hardware accelerator transmitting blocks of the firmware image to the hardware component and periodically issuing reports on the status of the transmission of the firmware image. As described, a hardware accelerator may be a highly utilized resource of an IHS and its operation may be governed by service agreements that require its use on certain computational tasks at the expensive of administrative tasks, such as the tasks described herein. Accordingly, availability of hardware accelerator resources is not assured. As indicated in FIG. 3B, if any errors are encountered or the delegation is terminated by the hardware accelerator, embodiments may continue by initiating the failover procedures described with regard to FIG. 4.

In scenarios where the complete firmware image is transmitted to the managed component without errors, at 395, the remote access controller initiates an update of the firmware of the managed component using the firmware image transmitted by the hardware accelerator. With this update of the firmware of the managed component initiated, as indicated in FIG. 3B, embodiments may return to 355 for selection of another hardware component to the updated using the firmware image, where transmission of the firmware image to the selected hardware component again being delegated to the hardware accelerator. In this manner, embodiments support transmission of firmware updates to managed components using the high-bandwidth transmission capabilities of hardware accelerator such that the firmware image is transmitted to the hardware component in significantly less time than would be possible using only the component management pathways that are available to the remote access controller.

FIG. 4 is a flowchart describing certain additional steps of a method, according to some embodiments, for error recovery during the use of hardware accelerators to update firmware used by hardware components of an IHS. Embodiments of FIG. 4 may begin at 405, with the detection of a termination of or failure in the transmission of a firmware image to a managed hardware component of an IHS, where the transmission of the firmware image has been delegated to a hardware accelerator of the IHS. Such errors may be detected in various manners and by various components of the IHS.

Upon detecting such error, at 410, the remote access controller determines the portion of the firmware image that was not successfully transmitted to the managed hardware component by the hardware accelerator. The remote access controller may make this determination based on queries to the managed hardware component, the hardware accelerator, and/or the cloud system storing the firmware image. The remote access controller may also make this determination based on the periodic status reports issued by the hardware accelerator during transmission of the portion of the firmware image that was successfully transmitted to the managed hardware component.

At 415, the remote access controller initiates a management connection with the managed hardware component in order to resume transmission of the firmware image to this hardware component. As described with regard to FIG. 2, a remote access controller 230 may include capabilities for utilizing multiple signaling pathways for interfacing with a managed hardware component. For example, a remote access controller may utilize a sideband management channel, such as an I2C bus that is used exclusively by the remote access controller in providing management of the managed hardware component. In addition, the remote access controller may use any of the available in-band signaling pathways to transmit information to a managed hardware component. Available in-band signaling pathways may provide superior transmission speeds and bandwidth in comparison to lower-throughput sideband management signaling pathways. However, these inband signaling pathways are shared resources and thus subject to contention. For instance, a remote access controller may utilize a PCIe switch fabric in transmitting data to a managed hardware component of an IHS. This PCIe switch fabric provides a high-speed and high-bandwidth communication channel for transmission of firmware images. But, administrative transmissions on the PCIe switch fabric by the remote access controller may be subject to bandwidth availability. Accordingly, embodiments may select a failover signal pathway for transmission of the remaining portion of the firmware image based on bandwidth availability, and also based on reliability of the available signaling pathways.

With the failover signaling pathway selected, at 420, the remote access controller begins transmitting blocks of the firmware image to the managed hardware component. Rather than pushing blocks of the firmware image to the hardware component, the remote access controller is limited to providing blocks of the firmware image to the hardware component in response to requests from the hardware component for delivery of the next blocks of the firmware image, where the hardware component may request different size blocks and may do so at a rate of its choosing. In many instances, the firmware image is transmitted to the managed hardware component according to the PLDM device management protocol, which may enable rebootless firmware updates of a hardware component. However, in such firmware update protocols, the device being updated is provided blocks of a firmware image only upon request by that device, thus allowing the device the opportunity to manage its local resources in order to support a rebootless firmware update of the device. Accordingly, during these failover procedures, the remote access controller fetches blocks of the remaining portion of the firmware image from the cloud system and, upon request from the managed hardware component, forwards blocks of the firmware image to the hardware component via the initiated management connection.

As described above, an impetus for delegating the transmission of the firmware image to a hardware accelerator in the limited data storage resources available to the remote access controller. Even though a remote access controller may include a dedicated memory, such as described with regard to FIG. 2, the local data storage resources of the remote access controller may be insufficient to store the entire firmware image the transmitted to the managed hardware component, or at least without consuming a large fraction of the local storage available to the remote access controller. Accordingly, embodiments support failover transmissions by the remote access controller that are matched to the capabilities of the managed hardware component.

In determining the capabilities of the managed hardware component, at 425, the remote access controller tracks the frequency of requests for firmware image blocks by the hardware component. In addition, at 430, the remote access controller tracks the size of the firmware image blocks requested by the managed hardware component. Upon confirming a relatively stable frequency and block size of the requests for firmware image data by the managed hardware component, at 435, the remote access controller begins prefetching of firmware image blocks according to the frequency and block size of the requests by the managed hardware component. As described, the remote access controller includes limited memory storage resources. Accordingly, the transfer of a large firmware image to a hardware component by the remote access controller requires that the remote access controller maintain only a portion of the firmware image in local storage at any one time.

As the remote access controller receives requests for firmware image blocks from the managed hardware component, the remote access controller forwards locally stored firmware image blocks to the hardware component and prefetches additional firmware image blocks at the rate and size matched to the hardware component's request for firmware image blocks. In embodiments, the remote access controller efficiently manages use of local storage resources by prefetching firmware image blocks at a frequency and size that is matched to the requests by the hardware component. In this manner, the remote access controller maintains a fixed number and size of prefetched firmware blocks for forwarding to the managed component such that the remote access controller reserves only a necessary of memory to support the transfer and the managed component does not have to wait for the remote access controller to retrieve blocks of the firmware image from the cloud system that stores entire firmware image.

While prefetching firmware image blocks in this manner, at 440, the remote access controller determines whether the entire firmware image has been transmitted to the managed hardware component. If the transmission is not yet complete, as indicated in FIG. 4, embodiments continue transmission of blocks of the firmware image to the managed hardware component and continue tracking the size and frequency of the requests for blocks of the firmware image. If any changes in the size and/or frequency of the requests by the managed hardware component are detected, the remote access controller may make corresponding adjustments in the frequency and/or size of the prefetching of firmware image blocks.

Once the entire firmware image has been transmitted to the managed hardware component, at 445, the remote access controller initiates an update of the firmware used to operate the managed hardware component, where the update utilizes the firmware image transmitted in part by the hardware accelerator, and in part through the failover procedures of the remote access controller. In this manner, embodiments support rapid delivery of firmware updates to managed hardware components, while also providing fault tolerance in scenarios where errors are encountered during transmission of a firmware image to the managed hardware component. Additionally, when the transmission of firmware images is part of a rebootless firmware update, recovery from errors during transmission of a firmware image preserves the seamless aspect of the rebootless firmware update such that operations of an IHS are not otherwise affected by errors encountered during transmission of a firmware update to a managed hardware component.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

23

The invention claimed is:

1. An Information Handling System (IHS) comprising:
one or more CPUs utilizing one or more PCIe (Peripheral Component Interconnect Express) buses that connect to at least one programmable hardware accelerator; and
a remote access controller supporting remote management of the IHS, the remote access controller comprising a logic unit and a memory device having instructions stored thereon that, upon execution by the logic unit, cause the remote access controller to:
    initiate an update of firmware that is used to operate a hardware component of the IHS;
    determine an availability of the hardware accelerator to transmit data to the hardware component of the IHS;
    authenticate the hardware accelerator as authorized to interface directly with the hardware component;
    delegate transmission of a firmware image to the hardware component by the hardware accelerator;
    based on the authentication of the hardware accelerator, generate a credential for the hardware accelerator to present to the hardware component, wherein the credential comprises a nonce or cryptographic token;
    transmit firmware image data to the hardware accelerator, wherein the firmwareimage data comprises instructions comprising a bus address for interfacing directly with the hardware component, wherein the firmware image data further comprises the credential; and
    upon transmission of the firmware image by the hardware accelerator, update the firmware of the hardware component using the firmware image transmitted by the hardware accelerator.

2. The IHS of claim 1, wherein the update of the firmware of the hardware component using the firmware image transmitted by the hardware accelerator is a rebootless update that does not include a reboot of the IHS.

3. The IHS of claim 1, wherein the firmware image that is delegated for transmission by the first hardware accelerator is stored on a cloud resource, and wherein the firmware image data provided to the hardware accelerator by the remote access controller comprises an address from which to retrieve the firmware image stored by the cloud resource.

4. The IHS of claim 1, wherein the instructions provided by the remote access controller for interfacing with the hardware component comprise a unique identifier for identifying the hardware component.

5. The IHS of claim 4, wherein execution of the instructions further causes the remote access controller to:
    generate an inventory of a plurality of managed hardware components of the IHS; and
    identify the at least one programmable hardware accelerator within the inventory of managed hardware components of the IHS.

6. The IHS of claim 1, wherein the hardware accelerator generates periodic updates on a status of the transmission of the firmware image to the hardware component.

7. The IHS of claim 6, wherein execution of the instructions further causes the remote access controller to:
    based on the updates by the hardware accelerator, provide an administrator using a remote management interface with updates on progress in the update to the firmware of the hardware component.

8. The IHS of claim 1, wherein execution of the instructions further causes the remote access controller to:
    upon detecting a failure in the delegated transmission of the firmware image to the hardware component by the hardware accelerator, initiate recovery procedures for transmitting a remaining portion of the firmware image to the hardware component.

9. The IHS of claim 8, wherein the recovery procedures comprise transmitting the remaining portion of the firmware image via a management pathway coupling the remote access controller to the hardware component.

10. The IHS of claim 9, wherein the management pathway comprises a sideband signaling pathway utilized by the remote access controller in managing the hardware component.

11. A method for updating firmware used by a managed hardware component of an Information Handling System (IHS), the method comprising:
    initiating, by a remote access controller of the IHS that operates separate from one or more CPUs of the IHS and that provides remote management of the IHS, an update of firmware used to operate the hardware component of the IHS;
    detecting a programmable hardware accelerator within an inventory of managed hardware components of the IHS;
    determining an availability of the hardware accelerator to transmit data to the hardware component of the IHS;
    authenticating the hardware accelerator as authorized to interface directly with the hardware component;
    delegating transmission of a firmware image to the hardware component by the hardware accelerator;
    based on the authentication of the hardware accelerator, generating a credential for the hardware accelerator to present to the hardware component, wherein the credential comprises a nonce or cryptographic token;
    transmitting firmware image data to the hardware accelerator, wherein the firmware image data comprises instructions comprising a bus address for interfacing directly with the hardware component, wherein the firmware image data further comprises the credential; and
    upon transmission of the firmware image by the hardware accelerator, updating the firmware of the hardware component using the firmware image transmitted by the hardware accelerator.

12. The method of claim 11, wherein the update of the firmware of the hardware component using the firmware image transmitted by the hardware accelerator is a rebootless update that does not include a reboot of the IHS.

13. The method of claim 11, wherein the hardware accelerator generates periodic updates on a status of the transmission of the firmware image to the hardware component.

14. A remote access controller supporting remote management of a plurality of managed hardware components of an Information Handling System (IHS), the remote access controller comprising:
    a logic unit and a memory device having instructions stored thereon that, upon execution by the logic unit, cause the remote access controller to:
        initiate an update of firmware used to operate a first of the plurality of hardware components of the IHS;
        detect a programmable hardware accelerator within an inventory of the plurality of managed hardware components of the IHS;
        determine an availability of the hardware accelerator to transmit data to the hardware component of the IHS;
        authenticate the hardware accelerator as authorized to interface directly with the hardware component;
        delegate transmission of a firmware image to the hardware component by the hardware accelerator;

based on the authentication of the hardware accelerator, generate a credential for the hardware accelerator to present to the hardware component, wherein the credential comprises a nonce or cryptographic token;

transmit firmware image data to the hardware accelerator, wherein the firmware image data comprises instructions comprising a bus address for interfacing directly with the hardware component, wherein the firmware image data further comprises the credential; and upon transmission of the firmware image by the hardware accelerator, update the firmware of the hardware component using the firmware image transmitted by the hardware accelerator.

15. The remote access controller of claim 14, wherein the update of the firmware of the hardware component using the firmware image transmitted by the hardware accelerator is a rebootless update that does not include a reboot of the IHS.

* * * * *